(12) United States Patent
Eliason et al.

(10) Patent No.: US 11,261,848 B2
(45) Date of Patent: Mar. 1, 2022

(54) FIELD MACHINING OF WIND TURBINE GEARBOXES

(71) Applicant: Renew Energy Maintenance, LLC, Sioux Falls, SD (US)

(72) Inventors: Curt Eliason, Howard, SD (US); Michael Sebert, Howard, SD (US)

(73) Assignee: Renew Energy Maintenance, LLC, Sioux Falls, SD (US)

( * ) Notice: Subject to any disclaimer, the term of this patent is extended or adjusted under 35 U.S.C. 154(b) by 0 days.

(21) Appl. No.: 17/164,069

(22) Filed: Feb. 1, 2021

(65) Prior Publication Data

US 2021/0239097 A1   Aug. 5, 2021

Related U.S. Application Data

(60) Provisional application No. 62/968,267, filed on Jan. 31, 2020.

(51) Int. Cl.
| | |
|---|---|
| *B23P 6/00* | (2006.01) |
| *F03D 15/00* | (2016.01) |
| *F16H 57/021* | (2012.01) |
| *B66C 19/00* | (2006.01) |
| *F16H 57/00* | (2012.01) |
| *F16H 57/02* | (2012.01) |

(52) U.S. Cl.
CPC .............. *F03D 15/00* (2016.05); *B23P 6/002* (2013.01); *F16H 57/021* (2013.01); *B66C 19/00* (2013.01); *F05B 2230/80* (2013.01); *F16H 2057/0068* (2013.01); *F16H 2057/02078* (2013.01)

(58) Field of Classification Search
CPC .......... B23P 6/00; B23P 6/02; F05B 2230/80; F16H 2057/0068; F16H 2057/0075; F03D 80/50
See application file for complete search history.

(56) References Cited

U.S. PATENT DOCUMENTS 8,341,840 B2 *   1/2013   Kawano ................. F03D 80/50
                                                     29/889.1

\* cited by examiner

*Primary Examiner* — Christopher J Besler
(74) *Attorney, Agent, or Firm* — Fredrikson & Byron, P.A.

(57) ABSTRACT

A gearbox repair assembly is disclosed herein. The gearbox repair assembly includes a sleeve having an inner diameter configured to receive a bearing assembly and an outer diameter configured to fit within a bore of a gearbox housing. The gearbox housing can be part of a gearbox of a wind turbine. The gearbox repair assembly further includes a retaining plate configured to be attached to the gearbox housing for preventing an outer race of the bearing assembly from rotating in the bore relative to the gearbox housing. Also provided are methods to repair such a gearbox. The gearbox repair assembly and related methods reduce the time and cost needed to repair the gearboxes.

8 Claims, 9 Drawing Sheets

FIELD MACHINING OF WIND TURBINE GEARBOXES

CROSS-REFERENCE TO RELATED APPLICATION

This application claims the benefit of U.S. Provisional Application No. 62/968,267, filed Jan. 31, 2020, the contents of which are incorporated herein by reference.

TECHNICAL FIELD

The disclosure relates generally to gearbox repair assemblies. This disclosure also provides methods of repairing a gearbox, such as a gearbox of a wind turbine.

BACKGROUND

There are many manufacturers of wind turbine gearboxes, and there are a variety of systemic problems related to the various types of gearboxes. One common problem is that bearings in the cast gearbox housings can become overloaded. This causes the outer race of the bearings to spin in the housing bore, thereby causing misalignment of the gear teeth from one drive component to another. If allowed to progress, this can cause catastrophic failure of the gearbox. In some cases, gear teeth can break off and travel throughout the rest of the drive train, causing even further damage.

To address the problems described above, known solutions involve replacing the gearbox with either a new or rebuilt unit. However, this is a time-consuming process. Additionally, the expense of a replacement gearbox and the related crane and crews required to make this replacement are extremely high.

SUMMARY

A wind turbine gearbox repair assembly is disclosed herein. The wind turbine gearbox repair assembly of the present disclosure allows for field repair of wind turbine gearboxes. In some cases, the entire repair process can occur in a nacelle of the wind turbine. The illustrative wind turbine gearbox repair assembly drastically reduces the cost to repair wind turbine gearboxes at the site. It also reduces the time required to repair the gearbox and put it back into operation.

The wind turbine gearbox repair assembly may include a sleeve having an inner diameter configured to receive a bearing assembly and an outer diameter configured to fit within a bore of a gearbox housing. The gearbox housing may be part of a gearbox of a wind turbine. The wind turbine gearbox repair assembly may further include a retaining plate configured to be attached to the gearbox housing for preventing an outer race of the bearing assembly from rotating in the bore relative to the gearbox housing.

To repair such a gearbox, a surface of the gearbox housing can be cut so as to increase a size of a bore in the gearbox housing. Then, a sleeve, followed by a bearing assembly, can be installed in the bore. The bearing assembly includes an outer race with an outer surface that contacts the sleeve when installed. A retaining plate can then be attached to the gearbox housing adjacent the bore. A retaining assembly can be provided and may include a first portion that is part of the retaining plate and a second portion that is part of the bearing assembly. The retaining plate and the bearing assembly can be positioned relative to one another such that the first and second portions of the retaining assembly are engaged so as to prevent the outer race of the bearing assembly from rotating in the bore relative to the gearbox housing.

Inventive principles described herein may be incorporated into a variety of different wind turbine gearbox repair assembly configurations. The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1:
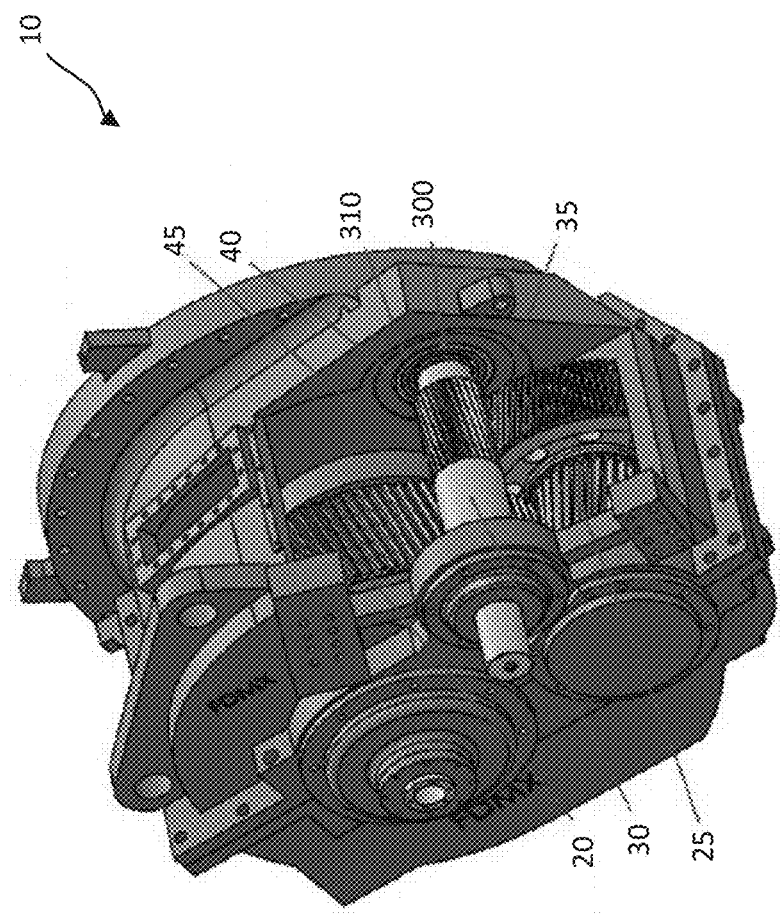
FIG. 1 is a front perspective view of a portion of a wind turbine gearbox, partially cut-away so as to illustrate certain interior components of the gearbox.
Figure 2:
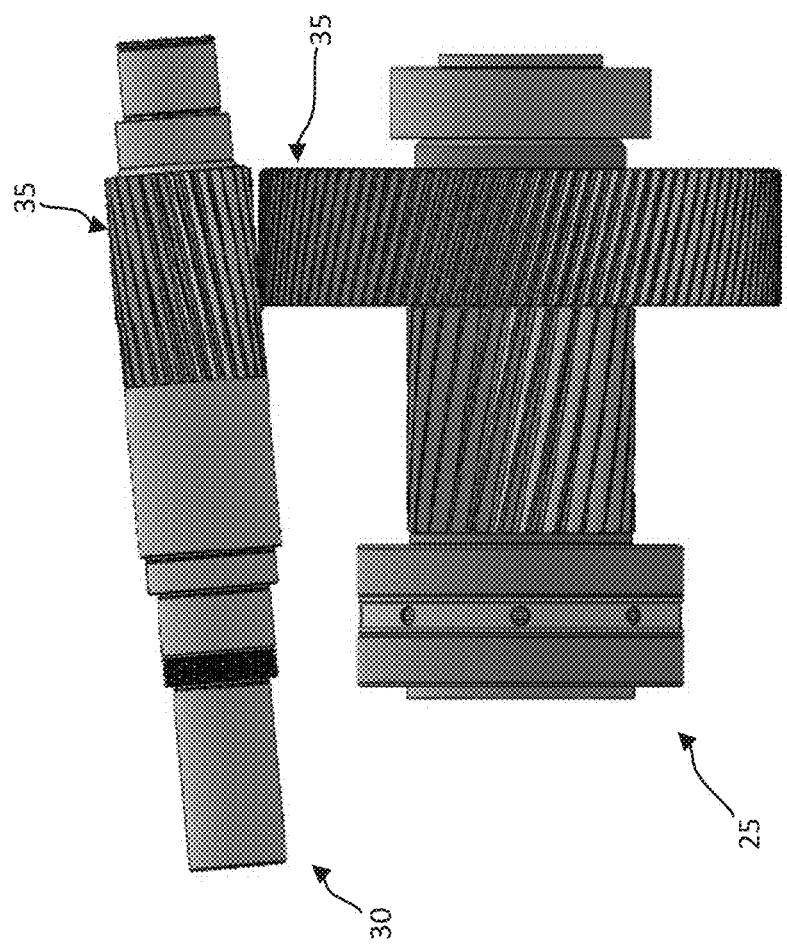
FIG. 2 is a side view of two gears of a gearbox having gear teeth that are misaligned between the two gears.

The present disclosure relates to a gearbox repair assembly and related repair methods. To facilitate an understanding of the present disclosure, a portion of a gearbox 10 is shown in FIG. 1. Specifically, a parallel stage of a drivetrain of a wind turbine gearbox is shown partially cut-away so as to illustrate some of its interior components. The illustrated gearbox 10 has gears of various speeds and sizes, including, e.g., a low-speed gear 20, an intermediate gear assembly 25, and a high-speed pinion 30. When the gearbox 10 is in proper working condition, the gear shaft axes are parallel to each other, and the different gears are aligned via their gear teeth 35. However, when the gear shaft axes are not exactly parallel, as shown in FIG. 2, the gear teeth 35 become misaligned and can cause catastrophic failure of the gearbox 10. Embodiments of the present disclosure are intended to prevent this type of situation from occurring.

Figure 3:
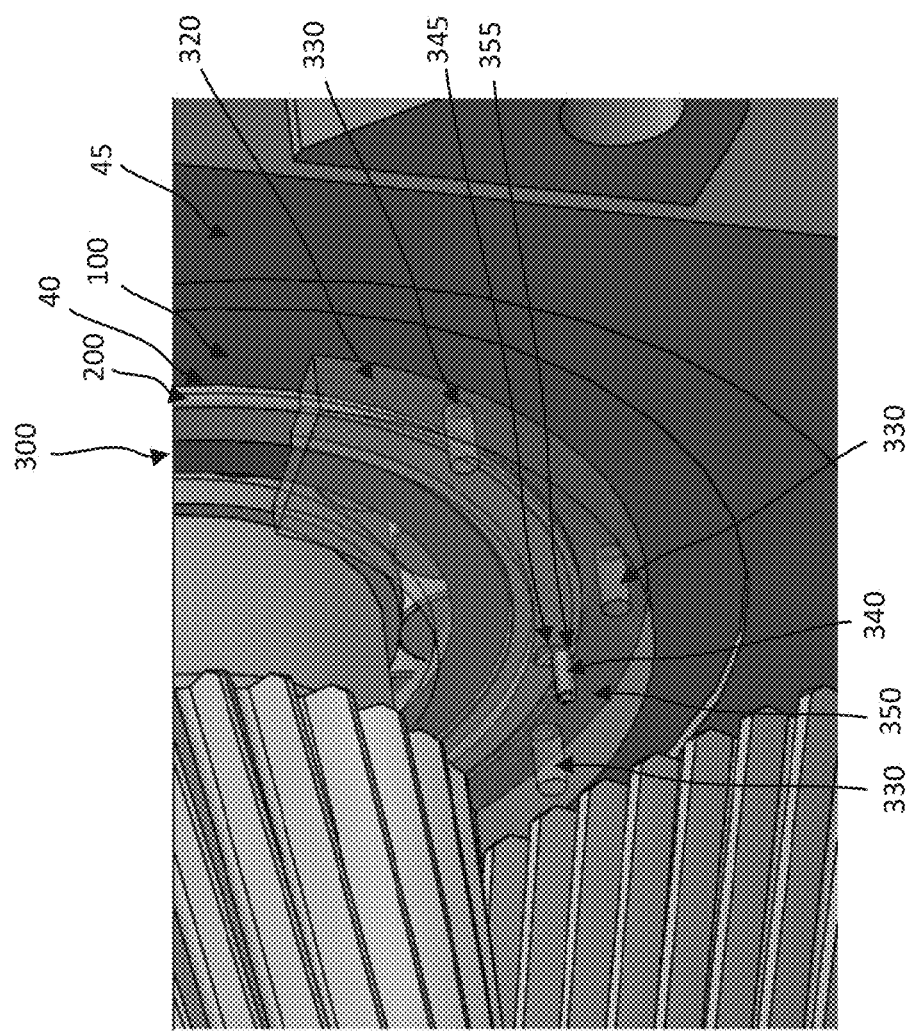
FIG. 3 is a perspective view of a portion of a wind turbine gearbox repair assembly in use.

The present disclosure provides a wind turbine gearbox repair assembly generally represented by reference numeral 100. As shown in FIG. 3, the wind turbine gearbox repair assembly 100 comprises a sleeve 200 having an inner diameter configured to receive a bearing assembly 300 and an outer diameter configured to fit within a bore 40 of a gearbox housing 45. The sleeve 200 can comprise any suitable material, such as cast iron. In such embodiments, the gearbox housing 45 is part of a gearbox 10 of a wind turbine.

Figure 4:
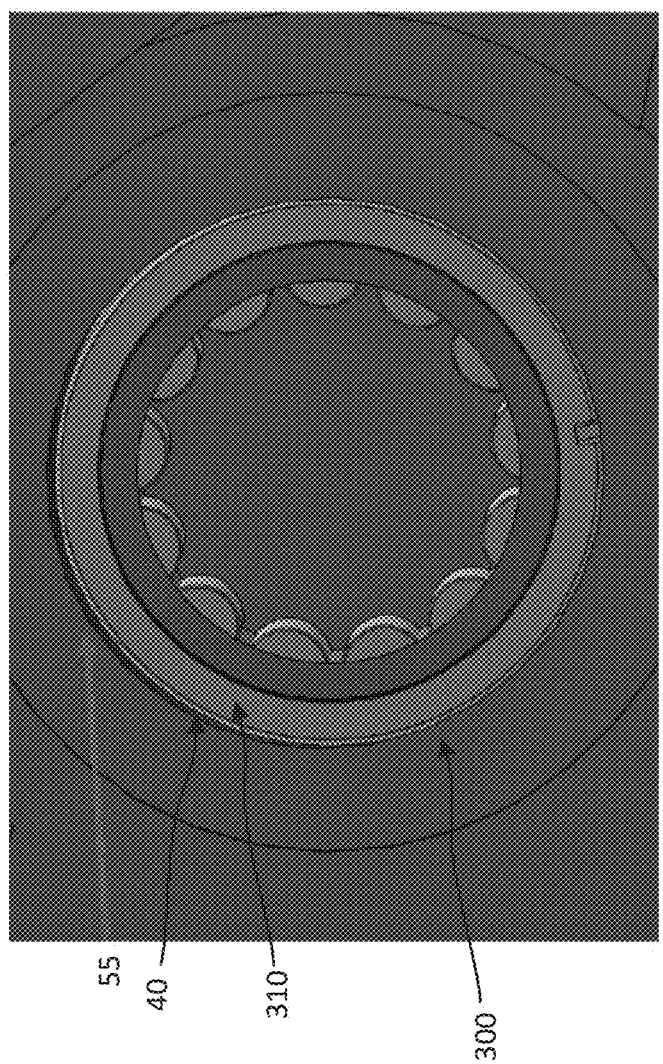
FIG. 4 is a detailed view of a bearing assembly in a bore of a gearbox housing, showing a gap between the gearbox housing and the bearing assembly.

The wind turbine gearbox repair assembly 100 is particularly useful when a gap 55 has formed between an outer race 310 of the bearing assembly 300 and an inner diameter of the bore 40. Such a gap 55 is shown in FIG. 4 and causes the outer race 310 of the bearing assembly 300 to rotate in the bore 40. Due to pressure of the gear mesh and rotation of the outer race 310 of the bearing assembly 300, the bearing assembly 300 will be pushed toward the gap 55. This causes misalignment of the gear teeth 35 between different components of the gearbox 10 and can lead to catastrophic failure of the gearbox 10.

When the outer race 310 of the bearing assembly 300 has previously spun in the bore 40, this can be visually detected by inspecting a plate not shown) located at a rear surface of the bore 40 behind where the bearing assembly 300 is located. When radial lines appear on the plate, this provides an indication that the outer race 310 of the bearing assembly 300 has spun in the bore 40.

To repair a gearbox 10 having the gap 55 described above, the sleeve 200 can be installed in the bore 40 to occupy the space formed by the gap 55 and bring the bore 40 back to correct dimensional specifications. The sleeve 200 can be secured in place using any conventional attachment means, such as, but not limited to, spring pins. This will help prevent the outer race 310 of the bearing assembly 300 from spinning in the bore 40.

As described in greater detail below, prior to installing the sleeve 200 in the bore 40, the sleeve 200 can be cooled so as to shrink its outer diameter. Then, after the sleeve 200 has been installed, a surface of the sleeve 200 can be cut until the inner diameter of the sleeve 200 corresponds to an outer diameter of the bearing assembly 300, within acceptable tolerances.

Since various types of gearboxes can be repaired using the present repair assembly 100 and related methods, skilled artisans will appreciate that the sleeve 200 can be cut to any size needed for a particular gearbox. For any embodiment of the present disclosure, the bore 40 and the sleeve 200 can be cut so as to meet the standard ranges for bearing size fit based on standards set by the American Bearing Manufacturers Association. According to such standards, the bearing fit will vary depending on the particular bearing size.

The wind turbine gearbox repair assembly 100 further comprises a retaining plate 320 configured to be attached to the gearbox housing 45 for preventing the outer race 310 of the bearing assembly 300 from rotating in the bore 40 relative to the gearbox housing 45. The retaining plate 320 can be attached to the gearbox housing 45 through any suitable attachment means. As one non-limiting example, the attachment means can comprise a plurality of pins 330 (i.e., spring pins), as shown in FIG. 3.

To better illustrate the various components, the retaining plate 320 is shown as transparent in FIG. 3. In some cases, the retaining plate 320 includes a pin 340. The pin 340 is configured to project toward and engage a notch 345 in the bearing assembly 300 when the pin 340 is in an engaged position 350. The engaged position is shown in FIG. 3. The pin 340 can be a spring pin or any other suitable type of pin that is able to engage the notch 345 in the bearing assembly 300 and prevent the outer race 310 of the bearing assembly 300 from rotating in the bore 40.

Figure 5:
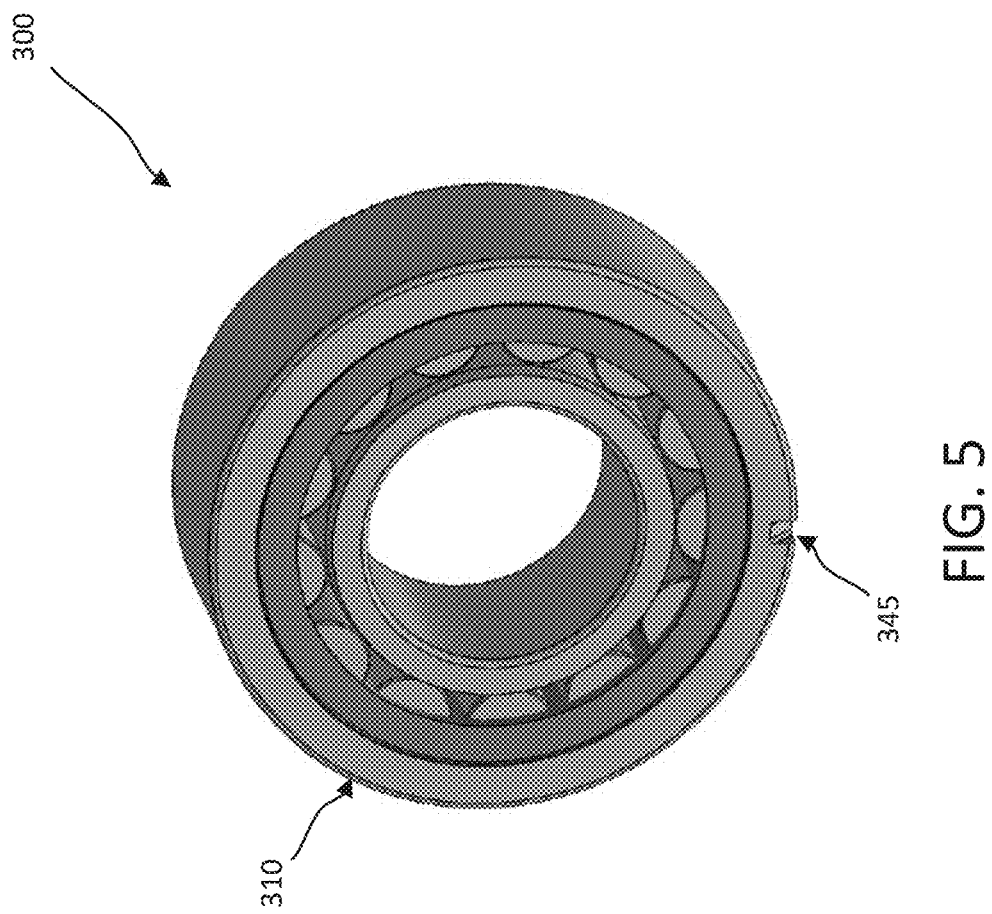
FIG. 5 is a perspective view of a bearing assembly of the present disclosure.

As best shown in FIG. 5, the notch 345 can be formed in the outer race 310 of the bearing assembly 300. A notch 355 can also be formed in the sleeve 200 (e.g., by drilling) and aligned with the notch 345 in the bearing assembly 300 such that the pin 340 engages both notches 345, 355 when the pin 340 is in the engaged position 350. The reverse configuration is also contemplated, i.e., with the notch 345 instead provided in the retaining plate 320 and the bearing assembly 300 configured to include a pin (similar to pin 340) that projects toward and engages the notch in the retaining plate 320.

In some embodiments, the wind turbine gearbox repair assembly 100 comprises a cutting tool 400 configured to cut a surface 60 of the gearbox housing 45 such that the bore 40 in the gearbox housing 45 is of sufficient size to receive the sleeve 200 therein. The cutting tool 400 is used to increase the size of the bore 40 so that the bore can accommodate the sleeve 200. Although not limiting, in many cases, the bore 40 will have an inner diameter of between about 2.5 inches and about 16 inches. The plate located in the bore 40 behind the bearing assembly 300 can be used to help locate the center of the bore 40 for machining purposes.

Figure 6:
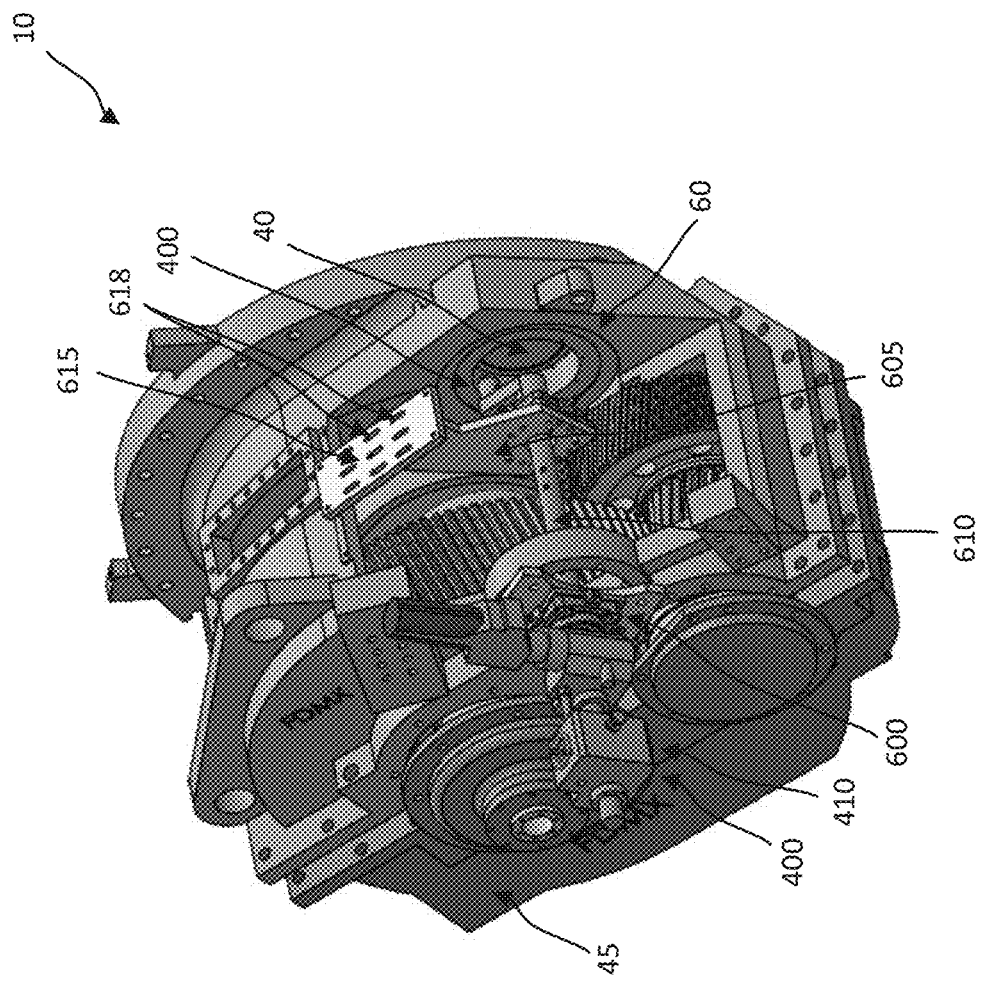
FIG. 6 is a front perspective view of a portion of a wind turbine gearbox that is similar to FIG. 1, except having a boring bar mounted to the gearbox, and with both the piston and the bearing assembly removed.
Figure 9:
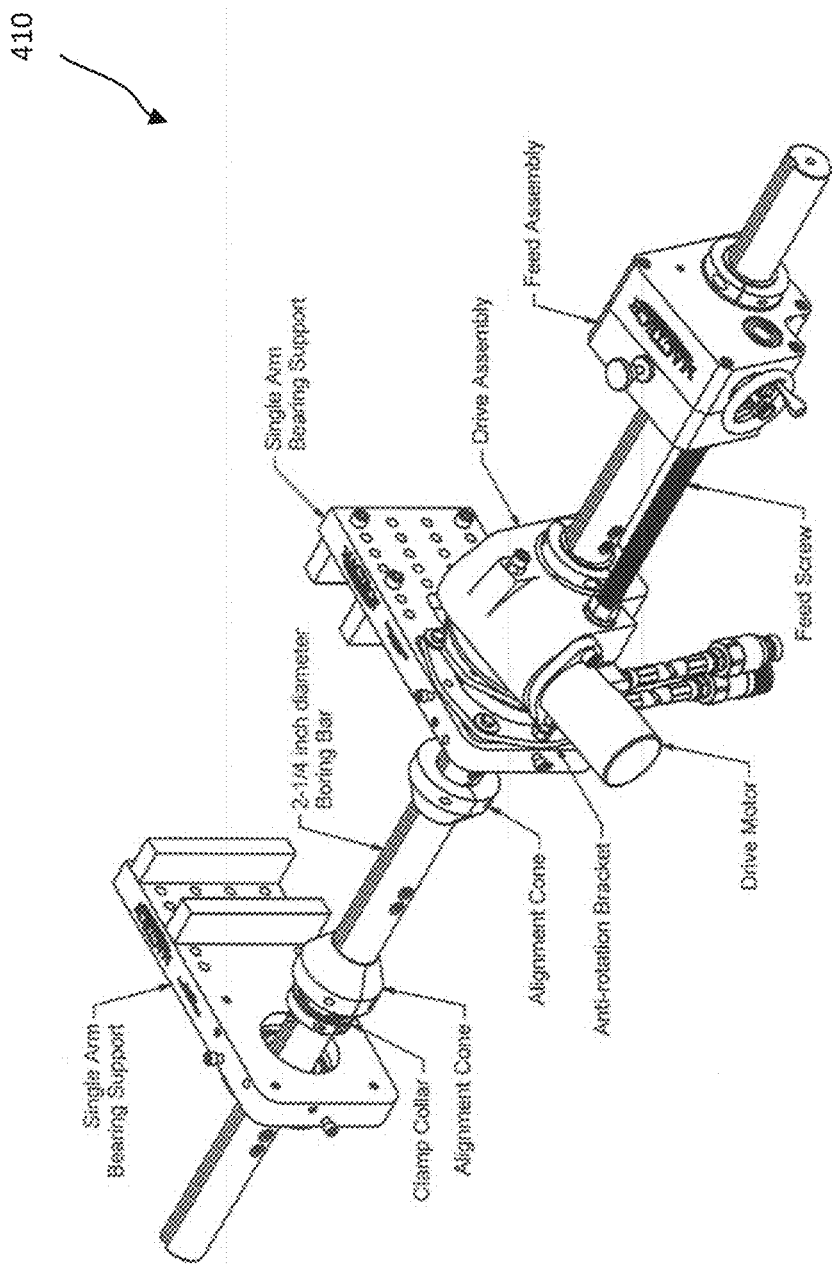
FIG. 9 is a perspective view of a boring bar.

The cutting tool 400 can be used manually or can be part of an automated cutting process. In some cases, the cutting tool 400 comprises a boring bar 410 that accepts a tooling. Boring bars 410 are well-known in the art, and an exemplary boring bar 410 is shown in FIG. 9. Any suitable boring bar system can be used, such as the BB1750 and BB2250 portable line boring machines manufactured by Mactech, Inc. (Red Wing, Minn.). As shown in FIG. 6, the boring bar 410 can be mounted to the gearbox 10 of a wind turbine so as to facilitate machining of the bore 40. The boring bar 410 can be attached to the gearbox 10 through any type of attachment means. In the embodiment shown in FIG. 6, for example, the boring bar 410 is attached to the gearbox 10 by a first retaining plate 600. This, however, is by no means limiting.

The boring bar 410 includes a shank 610. In some cases, the shank 610 can extend a distance of up to 36 inches so that the shank 610 is of sufficient length to simultaneously extend into multiple bores (e.g., both a rotor side and a generator side bore) of the gearbox housing 45. The boring bar 410 can be provided in various lengths, and in some cases, the boring bar 410 can extend up to 144 inches. The first retaining plate 600, along with a second retaining plate 605, can both be attached to the shank 610.

The gearbox 10 may include an inspection port 615. As shown in FIG. 6, the inspection port 615 can have holes 618 so as to allow access to inspect the condition of the gearing. Prior to using the boring bar 410, the inspection port 615 can be removed from the gearbox 10 to allow access to the boring job and can also be used as a place to mount the second retaining plate 605. For example, the second retaining plate 605 can be attached to a bottom of the inspection port 615.

The wind turbine gearbox repair assembly 100 can also comprise a micrometer configured to measure an inner diameter of the bore 40. In use, the micrometer can be positioned inside the bore 40 and turned until it touches the inner diameter of the bore 40. The resulting measurement can then be recorded.

Figure 7:
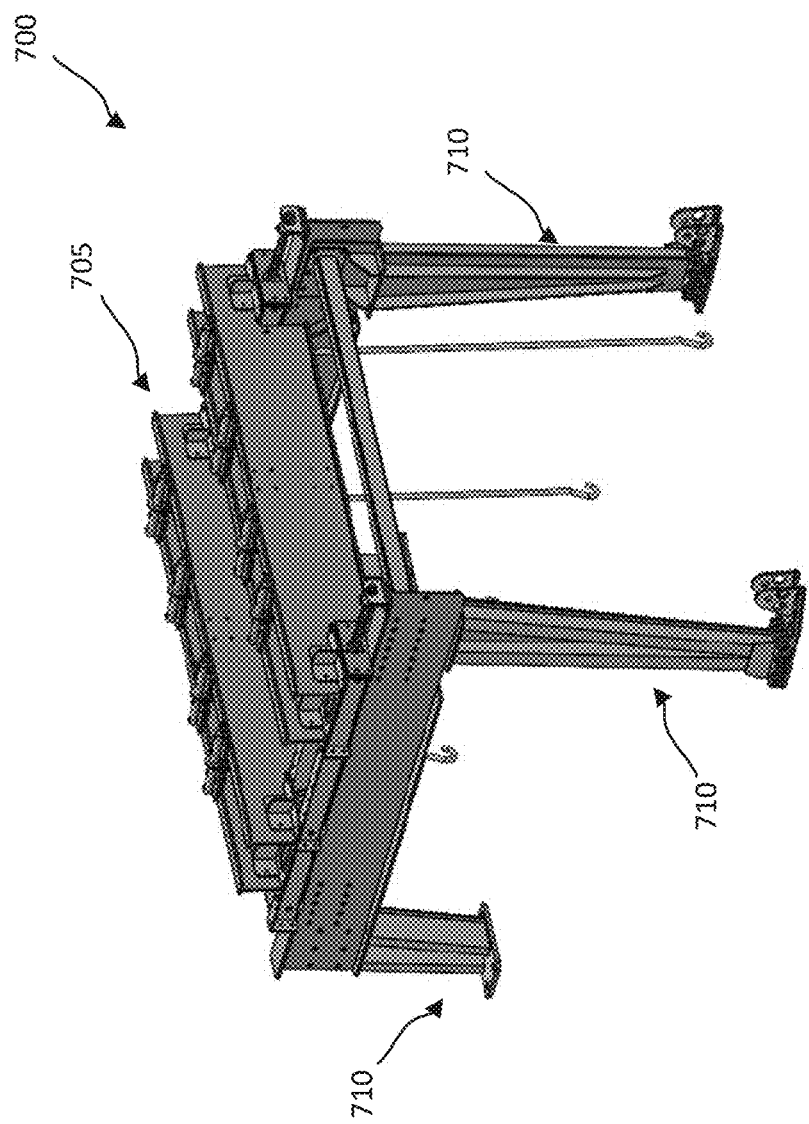
FIG. 7 is a front perspective view of a gantry crane of the present disclosure.

In certain embodiments, the wind turbine gearbox repair assembly 100 comprises a gantry crane 700. An exemplary gantry crane is shown in FIG. 7. As is well-known in the art, a gantry crane 700 is an overhead crane that includes a horizontal bridge 705 supported by A-frame legs 710. The legs 710 are often equipped with casters so that the crane 700 can be easily moved as needed. Alternatively, a gantry crane 700 can ride along a track installed on a ground surface.

The gantry crane 700 of the present disclosure can advantageously be built so as to fit in a nacelle of the wind turbine above the gearbox 10. When provided, the gantry crane 700 is configured to remove the gearbox housing 45 from the gearbox 10 and to facilitate repair of the gearbox housing 45 in the nacelle of the wind turbine. When the gantry crane 700 is installed in the nacelle, the entire repair process can be performed in the nacelle.

In many embodiments, the gantry crane 700 comprises one or more materials that are both strong and lightweight. This enables the gantry crane 700 to be strong enough to lift large portions of the gearbox 10 so as to facilitate repair of the gearbox 10, while also being lightweight enough that components of the gantry crane 700 can be taken into the nacelle and the gantry crane 700 assembled in the nacelle. In many cases, the gantry crane 700 comprises a lightweight metal (e.g., aluminum) or a lightweight metal alloy. If the gantry crane comprises a heavier material (e.g., steel), the gantry crane 700 may be too heavy to be lifted by technicians and installed in the nacelle. Thus, the gantry crane 700 should either be devoid of heavy materials, or any such heavy materials should be present in components of the gantry crane 700 in relatively low amounts, such that the gantry crane 700 is still lightweight enough to be easily handled by technicians.

Skilled artisans will appreciate that a gantry crane 700 is not required in all embodiments. Instead, in other cases, a crew and a conventional crane can be mobilized to the site when needed and used to lower the gearbox housing 45 down to the ground for repair. However, this is less desirable than using a gantry crane 700, since repair with a conventional crane can add significant time and cost. Furthermore, such a crane may not always be available when the repair is needed.

Figure 8:
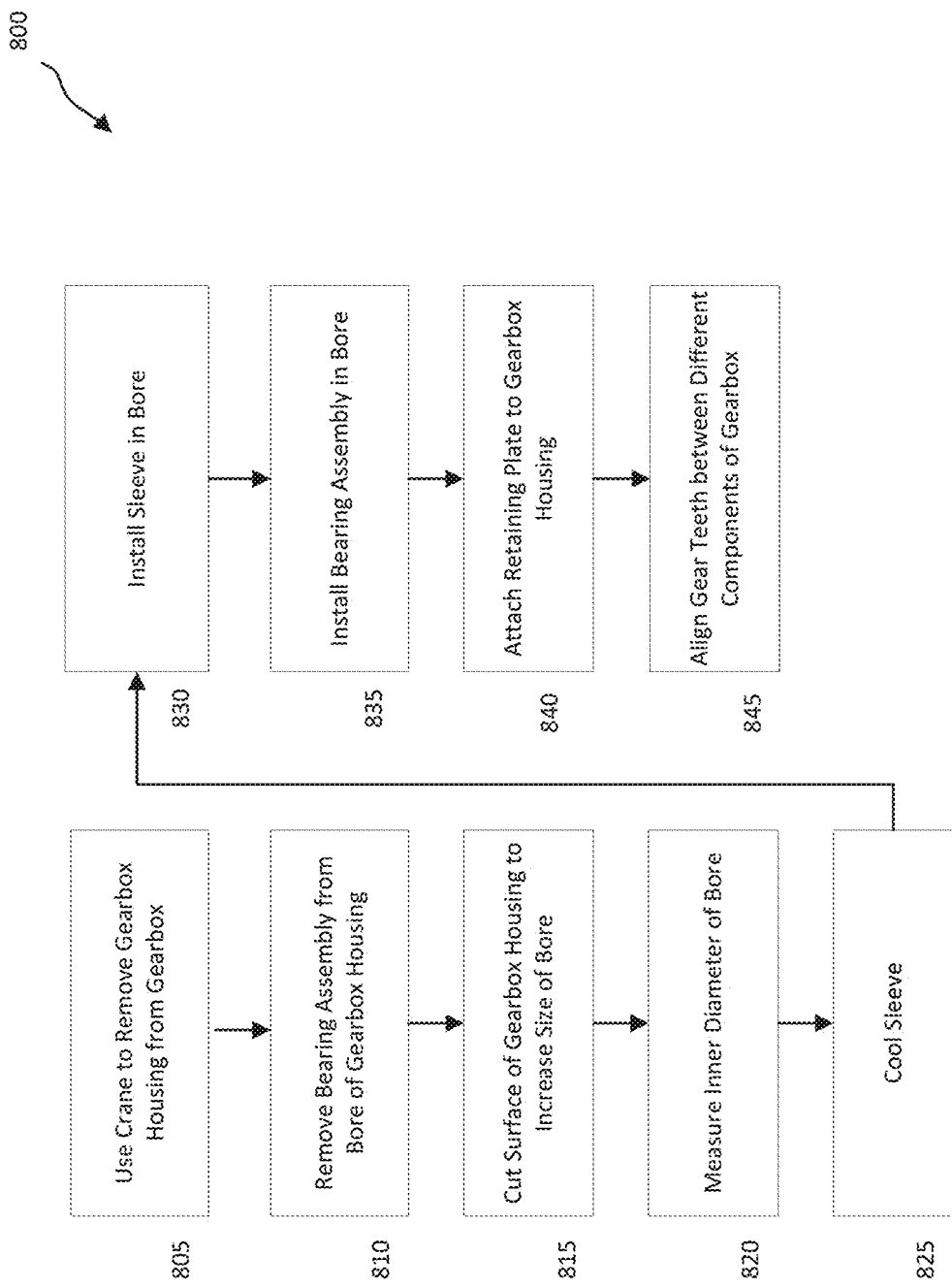
FIG. 8 is a flow chart of an illustrative method of repairing a gearbox.

An illustrative method 800 of repairing a gearbox is shown in FIG. 8. The method 800 can include the step 805 of using a crane to remove a gearbox housing from a gearbox. In some cases, the gearbox can be part of a wind turbine, as discussed above. Various types of cranes can be used for this purpose. In some cases, the crane can comprise a gantry crane installed above the gearbox. In some such cases, the gantry crane can be in the nacelle of the wind turbine.

Skilled artisans will appreciate that step 805 is not required in all cases. In some instances, depending on the gearbox make and model, the gearbox housing and the gearbox do not need to be separated from each other in order to complete the repair.

The method 800 can also include the step 810 of removing a bearing assembly from a bore of the gearbox housing. As noted, the bearing assembly may be damaged from overpressure. This enables a replacement bearing assembly to be installed in the bore in a later step of the method 800.

The method 800 can include the step 815 of cutting a surface of the gearbox housing so as to increase a size of a bore in the gearbox housing. In certain embodiments, cutting the surface of the gearbox housing is performed with a boring bar. In such cases, the boring bar can be mounted to the gearbox, e.g., by a retaining plate, as described above. In embodiments where a crane is used to remove the gearbox housing from the gearbox, such step is performed prior to cutting the surface of the gearbox housing.

After cutting the surface of the gearbox housing, the method 800 can include the step 830 of installing a sleeve in the bore. Thus, it is important that in step 815, the surface of the gearbox housing be cut so that the bore is of sufficient size to receive the sleeve. The sleeve can comprise any suitable material, such as cast iron. The sleeve can be secured in place, e.g., using pins, such as spring pins.

To ensure the sleeve will fit tightly in the bore, the method 800 can include the step 820 of measuring an inner diameter of the bore. This step can be performed using any suitable measuring instrument. In some instances, a micrometer can be used to measure the inner diameter of the bore using the techniques described above.

The method 800 can also include the step 825 of cooling the sleeve prior to installing the sleeve in the bore. In some cases, this can involve chilling or freezing the sleeve, e.g., by placing the sleeve in a freezer or in dry ice, or by spraying the sleeve with liquid nitrogen. This will shrink an outer diameter of the sleeve so that it can easily fit in the bore, without damaging or distorting the sleeve.

The method can also include the step 835 of installing a bearing assembly in the bore. This bearing assembly is intended to replace the bearing assembly that was removed in step 810. The replacement bearing assembly includes an outer race with an outer surface that contacts the sleeve when installed. In some cases, the replacement bearing assembly is installed in the sleeve before the sleeve is installed in the bore. In some cases, the sleeve is installed in the bore before the replacement bearing assembly is installed in the sleeve.

After the sleeve and the bearing assembly are installed in the bore, the method 800 can include the step 840 of attaching a retaining plate to the gearbox housing adjacent the bore. The retaining plate can retain the sleeve and the bearing assembly in the bore.

When the retaining plate is properly attached to the gearbox housing, a retaining assembly is configured to prevent the outer race of the bearing assembly from rotating in the bore. In particular, the retaining assembly can include a first portion that is part of the retaining plate and a second portion that is part of the bearing assembly. In certain embodiments, one of the first and second portions of the retaining assembly comprises a pin and the other of the first and second portions of the retaining assembly comprises a notch. In embodiments of this nature, the retaining plate and the bearing assembly are positioned relative to one another such that the first and second portions of the retaining assembly are engaged (i.e., the pin engages the notch) so as to prevent the outer race of the bearing assembly from rotating in the bore relative to the gearbox housing. In some cases, the first portion of the retaining assembly comprises the pin and the second portion of the retaining assembly comprises the notch such that the notch is provided in the bearing assembly and the retaining plate includes the pin. Although the retaining assembly has been described herein as a pin and notch, other configurations that are suitable for the same purpose (i.e., preventing the outer race of the bearing assembly from rotating in the bore) can alternatively be used.

In embodiments where a gantry crane is used, various steps of the method 800, including cutting the surface of the gearbox, installing the sleeve, installing the bearing assembly, and attaching the retaining plate, can all occur in a nacelle of the wind turbine. This is both less time-consuming and less costly than having to repair a wind turbine gearbox on the ground.

The method 800 can also include the step 845 of aligning the plurality of gear teeth between different components of the gearbox. This will ensure that the gears are in proper alignment with respect to each other.

Various examples have been described with reference to certain disclosed embodiments. The embodiments are presented for purposes of illustration and not limitation. One skilled in the art will appreciate that various changes, adaptations, and modifications can be made without departing from the scope of the invention.

The invention claimed is:

1. A method comprising:
   cutting a surface of a gearbox housing so as to increase a size of a bore in the gearbox housing, the gearbox housing being part of a gearbox;
   installing a sleeve in the bore;
   installing a bearing assembly in the bore, the bearing assembly including an outer race with an outer surface that contacts the sleeve when installed; and
   attaching a retaining plate to the gearbox housing adjacent the bore;
   wherein a retaining assembly is configured to prevent the outer race of the bearing assembly from rotating in the bore, the retaining assembly including a first portion that is part of the retaining plate and a second portion that is part of the bearing assembly, and
   wherein one of the first and second portions of the retaining assembly comprises a pin and the other of the first and second portions of the retaining assembly comprises a notch, wherein the retaining plate and the bearing assembly are positioned relative to one another such that the pin engages the notch so as to prevent the outer race of the bearing assembly from rotating in the bore relative to the gearbox housing.

2. The method of claim 1, wherein the first portion of the retaining assembly comprises the pin and the second portion of the retaining assembly comprises the notch.

3. The method of claim 1, wherein the cutting of the surface of the gearbox housing is performed with a boring bar.

4. The method of claim 1, wherein the gearbox is part of a wind turbine.

5. The method of claim 4, further comprising, prior to cutting the surface of the gearbox housing, using a crane to remove the gearbox housing from the gearbox.

6. The method of claim 5, wherein the crane comprises a gantry crane, and wherein cutting the surface of the gearbox, installing the sleeve, installing the bearing assembly, and attaching the retaining plate all occur in a nacelle of the wind turbine.

7. The method of claim 1, further comprising cooling the sleeve so as to shrink an outer diameter of the sleeve prior to installing the sleeve in the bore.

8. The method of claim 1, wherein the gearbox has a plurality of gear teeth, the method further comprising aligning the plurality of gear teeth between different components of the gearbox.

\* \* \* \* \*